(12) United States Patent
Wade

(10) Patent No.: US 6,375,222 B1
(45) Date of Patent: Apr. 23, 2002

(54) MOBILE STORAGE TANK HAVING A DOUBLE WALL CONSTRUCTION

(75) Inventor: Allen Wade, Ellisville, MS (US)

(73) Assignee: Wade Services, Inc., Ellisville, MS (US)

(*) Notice: Subject to any disclaimer, the term of this patent is extended or adjusted under 35 U.S.C. 154(b) by 0 days.

(21) Appl. No.: 09/490,058

(22) Filed: Jan. 24, 2000

(51) Int. Cl.[7] .................................................. B60P 3/22
(52) U.S. Cl. ........................ 280/837; 280/839; 220/562
(58) Field of Search ................................. 280/837, 839; 220/562

(56) References Cited

U.S. PATENT DOCUMENTS

| | | | | |
|---|---|---|---|---|
| 1,915,757 A | * | 6/1933 | Pierce | 280/839 |
| 2,567,164 A | * | 9/1951 | Brehany et al. | 280/839 |
| 3,489,320 A | * | 1/1970 | MacKinnon | 280/839 |
| 3,510,142 A | * | 5/1970 | Erke | 280/837 |
| 4,258,953 A | * | 3/1981 | Johnson | 280/839 |
| 5,301,980 A | * | 4/1994 | Dingle | 280/837 |
| D379,948 S | | 6/1997 | Wade | |
| 5,653,469 A | | 8/1997 | Wade | |
| 5,957,500 A | * | 9/1999 | Wade | 280/837 |
| 6,098,744 A | * | 8/2000 | Kawamura | 280/839 |
| 6,173,911 B1 | * | 1/2001 | Piona et al. | 280/839 |
| 6,176,279 B1 | * | 1/2001 | Dahlin et al. | 280/839 |
| 6,199,910 B1 | * | 3/2001 | Wade | 280/837 |

* cited by examiner

Primary Examiner—Brian L. Johnson
Assistant Examiner—Matt Luby
(74) Attorney, Agent, or Firm—Birch, Stewart, Kolasch & Birch, LLP

(57) ABSTRACT

A mobile storage tank has front and rear walls and a pair of opposing side walls each having ends being in contact with each of the front and rear walls is disclosed. A bottom wall extends from the front wall to the rear wall and abuts the pair of opposing side walls. The bottom wall has a generally flat portion along at least a length portion thereof, and has a curved portion a rest length portion thereof At least the bottom wall is formed having a double ply wall structure in order to prevent leakage of a material contained within the mobile storage tank should an interior wall of the bottom wall become punctured, and further to provide secondary containment.

24 Claims, 4 Drawing Sheets

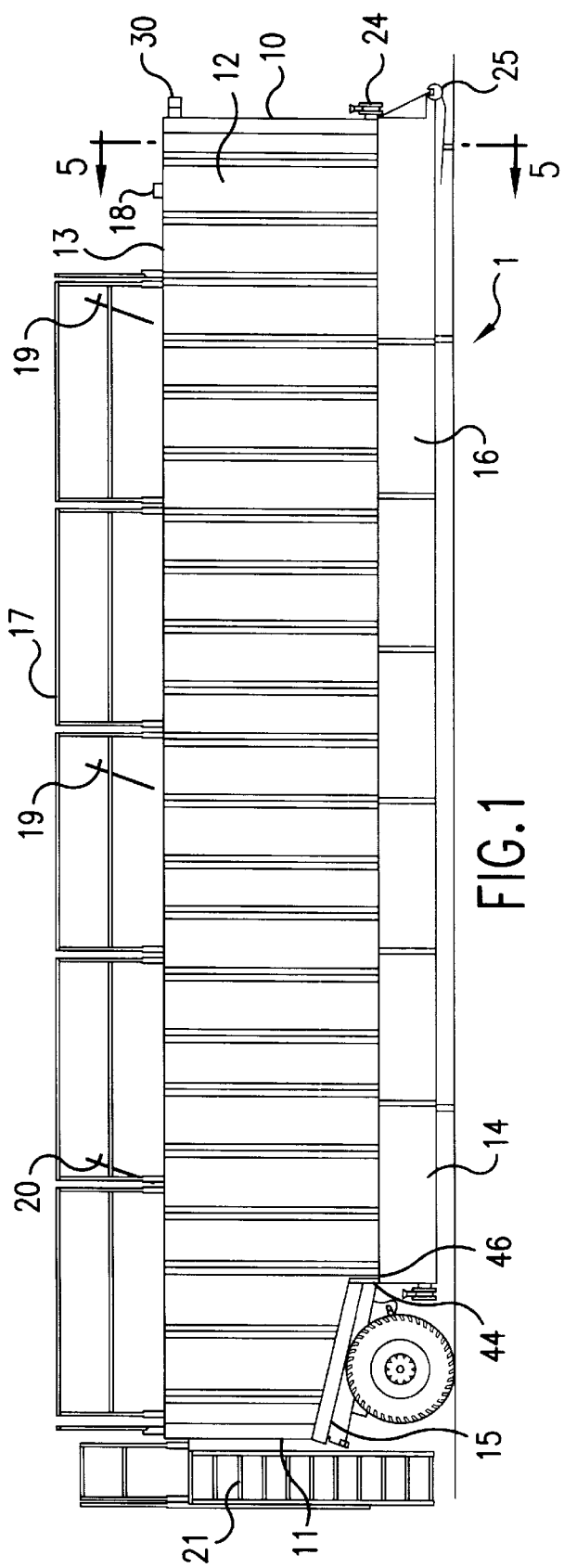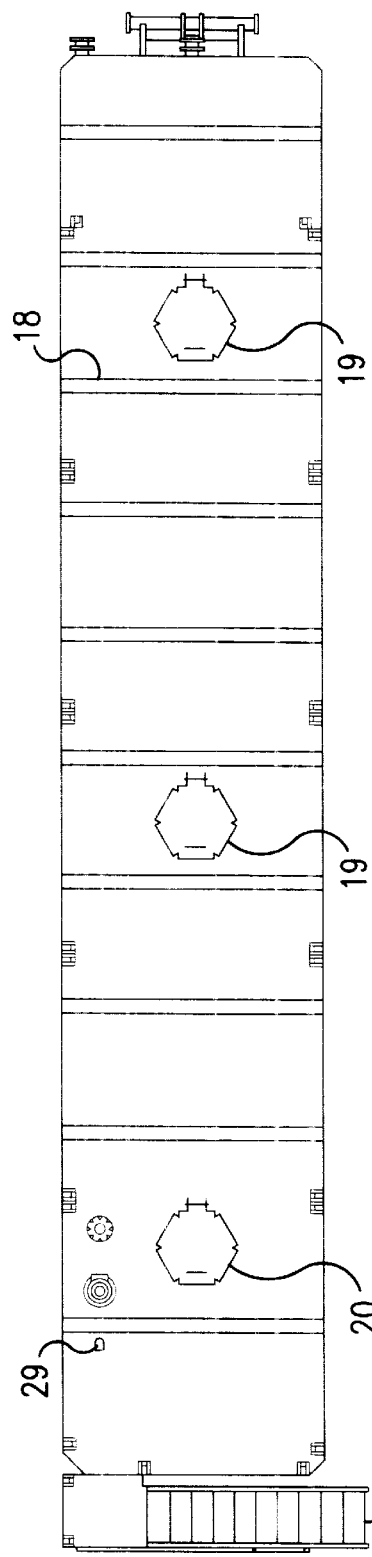

FRONT ELEVATION

FRONT ELEVATION

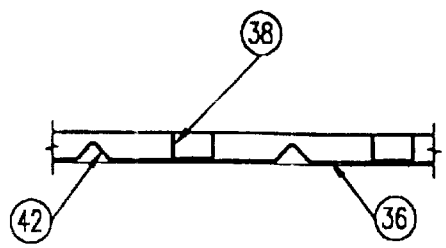
PLAN VIEW  FIG. 6
TANK VERTICAL SIDE WALL SECTION
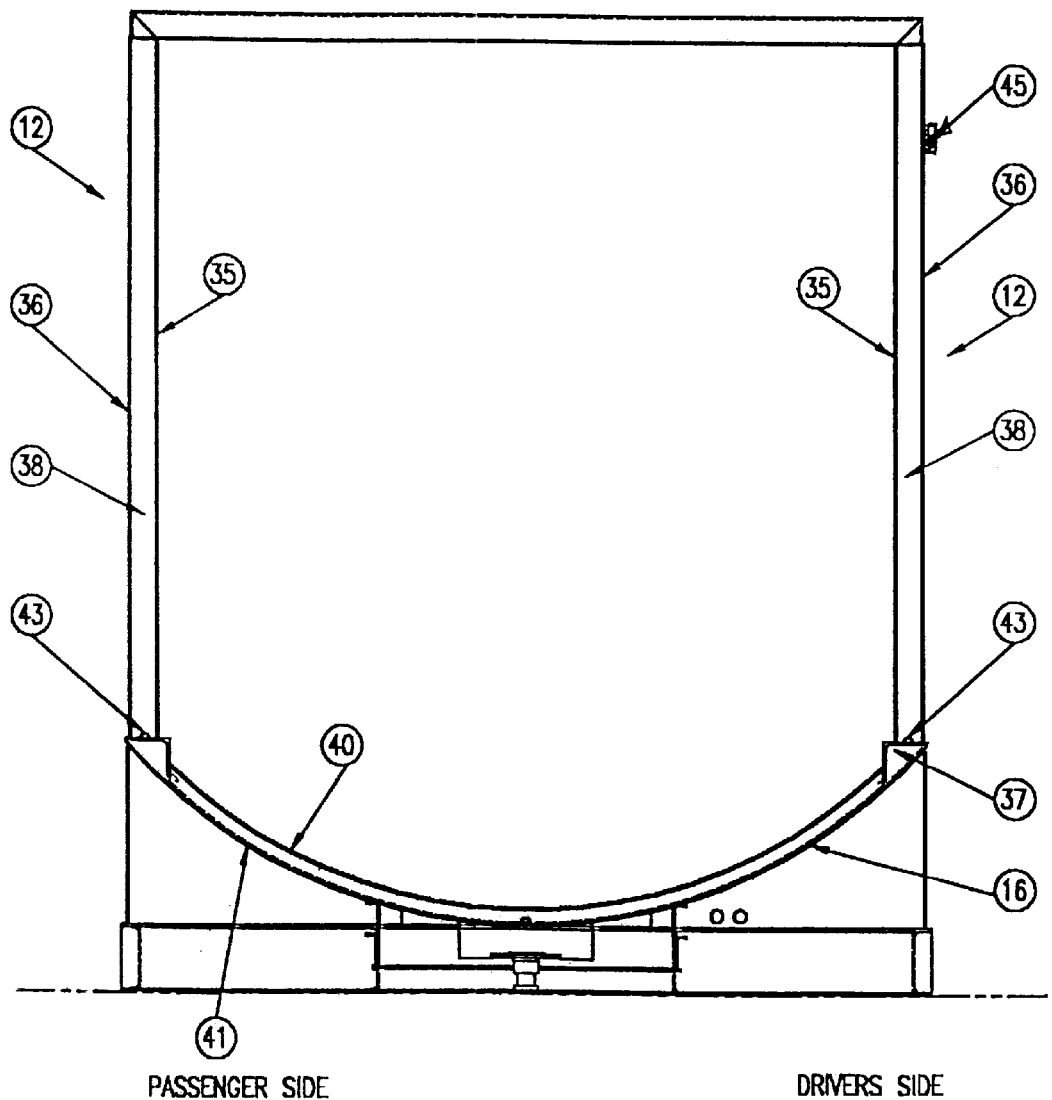
PASSENGER SIDE    DRIVERS SIDE
TANK END SECTION
FIG. 5

MOBILE STORAGE TANK HAVING A DOUBLE WALL CONSTRUCTION

BACKGROUND OF THE INVENTION

1. Field of the Invention

The present invention generally relates to mobile storage tanks for storing fluids and the like, and more particularly to mobile storage tanks with redundant structure for preventing leaks and providing secondary containment.

2. Description of the Related Art

Transportable tanks are currently provided for storing and dispensing fluids, such as fracturing liquids, fluid chemicals, waste fluids, or the like. These tanks are mobile in nature and may be towed by large trucks or vehicles to and from various work sites. Typically, such a mobile storage tank is transported to a work site and left there to be filled. The duration of the filling time may vary from several days to several months, and upward, based upon various work environment factors at any given work site. Since these mobile storage tanks may be required to hold chemical fluids, or other dangerous materials, as time passes at the work site, the risk of puncturing the mobile storage tank is increases. Moreover, if the mobile tank is left at a work site for a prolonged period of time during the winter, in colder parts of the country it is possible that the filled contents therein could freeze. If freezing occurs the tank structure may become unstable and crack due to expansion of a liquid fluid contents therein. If cracking occurs, the storage tank may leak when the frozen fluid thaws.

Therefore, there is a need to provide a mobile storage tank constructed to ensure that leakage therefrom does not occur, and simultaneously able to ensure that fluid filled therein will not freeze in colder climates.

SUMMARY OF THE INVENTION

In order to solve the deficiencies of the conventional art, it is an object of the present invention to provide a mobile storage tank having a double ply wall structure, thus, providing a secondary containment that will hold any leakage from the primary containment portion which might occur.

It is an additional object of the present invention to provide a mobile storage tank with structural walls which may be filled with steam or other insulating material in order to prevent freezing of contents filled in the mobile storage tank when it is deployed in cold climates.

A further object of the present invention is to provide a mobile storage tank with smooth interior walls to facilitate ease of cleaning and improved fluid flow at the time the storage tank is drained.

Another object of the present invention is to provide a mobile storage tank with significant structural stability in order to allow an interior containment cavity of the mobile storage tank to have slick inner walls with no internal bracing.

It is a further object of the present invention to provide a mobile storage tank which has an increased usage life span.

These and other objects of the present invention are fulfilled by providing a mobile storage tank, comprising a chaise frame for supporting the mobile storage tank; front and rear walls; a pair of opposing side walls each having ends in contact with said front and rear walls; a roof in contact with each of said front and rear walls and said pair of opposing side walls; a bottom wall extending from said front wall to said rear wall, said bottom wall having a generally flat portion along a length portion thereof and having a curved portion along a remainder of the length thereof, and a saddle portion supporting said curved portion of said bottom wall, said saddle portion positioned between said bottom wall and said chassis frame, wherein said front and rear walls, said pair of opposing walls and said bottom wall are a double ply wall.

In addition, these and other objects of the present invention are accomplished by providing a mobile storage tank, comprising front and rear walls; a pair of opposing walls each having ends in contact with said front and rear walls; and a bottom wall abutting said front and rear walls and said pair of opposing side walls, said bottom having a curved portion along at least a portion thereof, wherein at least said curved portion is a double ply wall.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is side elevation view of the mobile storage tank of the present invention;

FIG. 2 is a top plan view of the mobile storage tank 1n accordance with the present invention;

FIG. 5 is a fragmentary, cross-sectional view taken substantially along the line 5—5 of FIG. 1; and FIG. 6 is an enlarged view of the double ply wall construction in accordance with the mobile storage tank of the present invention.

DETAILED DESCRIPTION OF THE PREFERRED EMBODIMENTS

Figure 3:
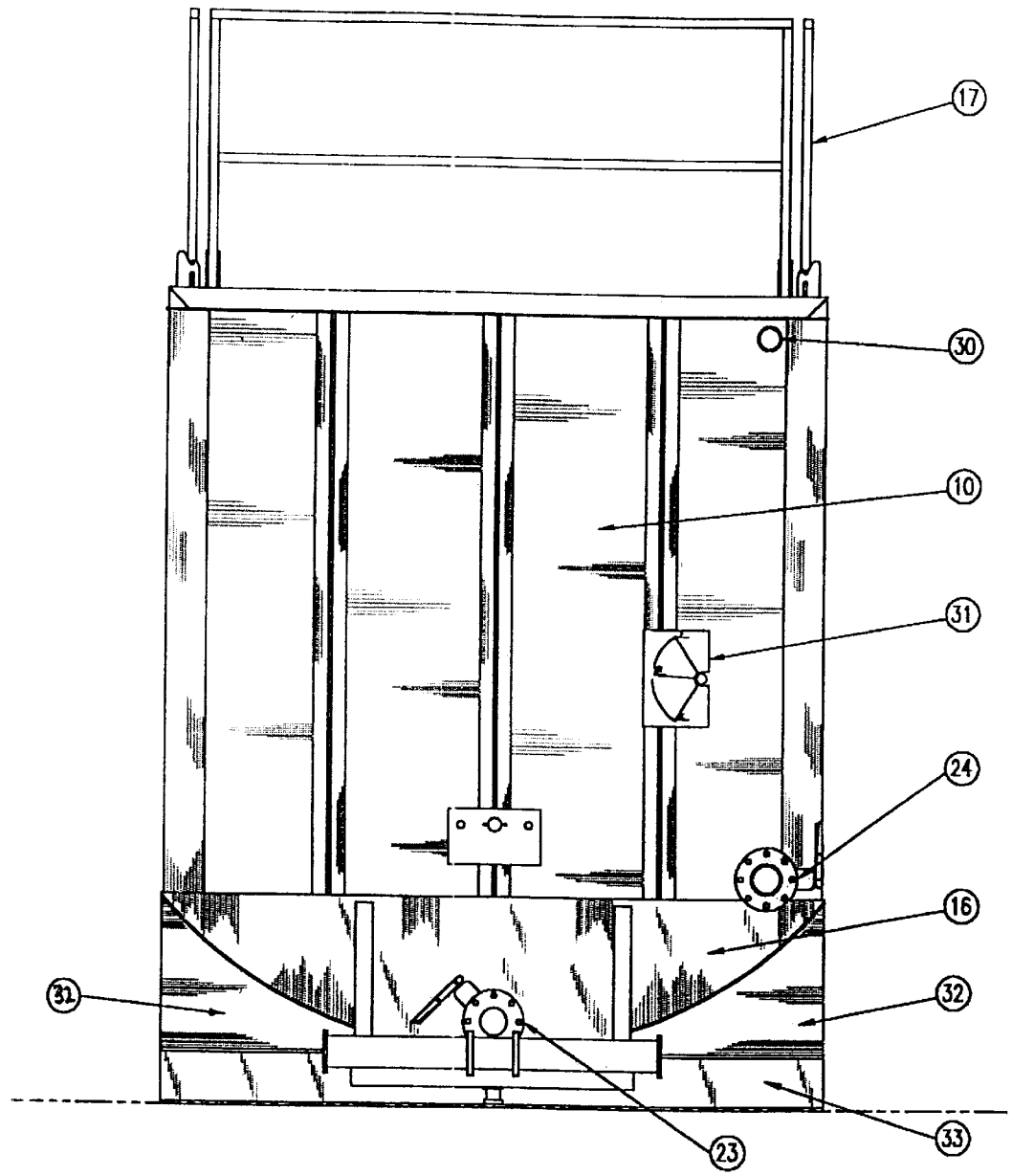
FIG. 3 is an enlarged front elevation view of the mobile storage tank 1n accordance with the present invention.

Referring to the drawings in greater detail, and more particularly the FIGS. 1 and 2, the mobile storage tank 1 of the present invention includes two vertical side walls 12 positioned on either side of a bottom wall 14. The bottom wall 14 includes two distinct formed sections along the length thereof At one end of the bottom wall 14 there is a flat portion 15, and extending from the flat portion 15 is a curved portion 16. Attached to the bottom wall 14 and the side walls 12, on the end with the flat portion 15, is a front wall 14. Attached to the bottom wall 14 and the side walls 12, at the end with the curved portion 16, is a rear wall 11. The mobile storage tank 1 further includes a roof 13 attached to upper ends of the side walls 12 and the front and rear walls 10, 11. The structure disclosed above defines an interior containment cavity of the mobile storage tank 1 for holding fracturing liquids, drilling muds, chemical fluids, or the like. This interior containment cavity can be sealed to be fluid and/or airtight with a pressure, vacuum relief valve.

Although the bottom wall 14 is shown has having a curved portion 16, the mobile storage tank 1 of the present invention is not limited to this design. Specifically, the curved portion 16 may be various shapes, as long as it has a discernible lowest most point. For example, the curved portion 16 may be V shaped, U shaped, or a shape having generally sloped sides.

The mobile storage tank 1 includes a loading hitch assembly 25 located at the front end position of the mobile storage tank 1. Mounted to the rear wall 11 of the mobile storage tank 1 is a roof access stairway 21. The roof access stairway 21 allows an individual to access a plurality of roof hatches 19 and 20 positioned along the length of the roof 13. The roof 13 is structurally supported with roof cross members 18 in order to provide sufficient strength to support a plurality of individuals when the roof hatches 19 and 20 are being accessed, and further to support internal pressure which is generated from within the containment cavity.

The roof hatches 19 are twenty-two inch, non-access hatches used to clean or wash out the mobile storage tank 1 with high pressure water, or the like. The roof hatch 20 is a twenty-two inch worker access hatch which includes a ladder (not shown) used when entering the cavity of the mobile storage tank 1 for inspection or cleaning purposes. Along a significant portion of the roof 13 are roof handrails 17. The roof handrails 17 are sectional and run along lateral sides of the mobile storage tank 1. The roof handrails 17 are also placed on both the front and back end of the mobile storage tank 1 and on the roof access stairway 21.

As seen in the enlarged front elevation view of FIG. 3, the mobile storage tank 1 includes an overflow valve 30 disposed on an upper portion of the front wall 10. The overflow valve 30 is constructed of three inch threaded pipe and is preferably welded through the front wall 10 in order to allow access to the interior of the mobile storage tank 1. The overflow valve 30 guards against overfilling the mobile storage tank 1. Moreover, the overflow valve 30 serves to warn an operator of the mobile storage tank 1 that an overflow condition exists. The construction of the overflow valve 30 is not limited to threaded pipe. It is readily apparent to those of ordinary skill in the art that various piping of various diameter and material may be substituted in place of three inch threaded pipe in order to achieve the same operational characteristics to the overflow valve 30.

Also disposed on the front wall 10 is a fill gauge indicator 31. The fill gauge indicator 31 includes a pointer that is attached to an arm inside the tank cavity. The arm has attached thereto two eight inch diameter floats which rotate in an arc from the top to the bottom of the interior of the mobile storage tank 1, thereby allowing the pointer to indicate the amount of material filled within the mobile storage tank 1. The fill gauge indicator 31 may be operated by way of an analog or digital measuring circuit connected to a fill sensor disposed within the mobile storage tank 1. Therefore, during filling of the mobile storage tank 1, the sensor detects the level of fluid or material within the storage tank 1 and displays on the fill gauge indicator 31 the fill level of the storage tank 1.

On the right-hand corner of the front wall 10 is disposed a front fill valve 24 for filling material into the cavity of the mobile storage tank 1. The front fill valve 24 is constructed using four inch pipe. Placed around the four inch pipe is a five inch pipe in order to create a double wall construction, thereby providing an area formed between the four inch pipe and the five inch pipe. Accordingly, if the inner four inch pipe leaks, the area between the five inch pipe and the four inch pipe will create a containment cavity which prevents spillage of material being filled into the mobile storage tank 1. Alternatively, a roof fill valve 29 (see FIG. 2) may be used to fill material into the cavity of the mobile storage tank 1. The roof fill valve 29 is constructed using a three inch 90-degree ell with a three inch threaded pipe nipple and a threaded cap. Both the front fill valve 24 and the roof fill valve 29 are not limited by the construction disclosed above. For example, the fill valves 24 and 29 may be implemented using any conventional tubing material positioned in any operationally conceived manner, as long as material passing through the fill valves 24 and 29 passes successfully into the mobile storage tank 1. Moreover, the invention is not limited to any particularly sized pipes or valves.

Located at the lowermost point of curved portion 16 of the front wall 10 is a front drain 23. The front drain 23 operates in the same manner as a rear drain 22 located on the rear of the mobile storage tank 1 (discussed hereinafter).

Figure 4:
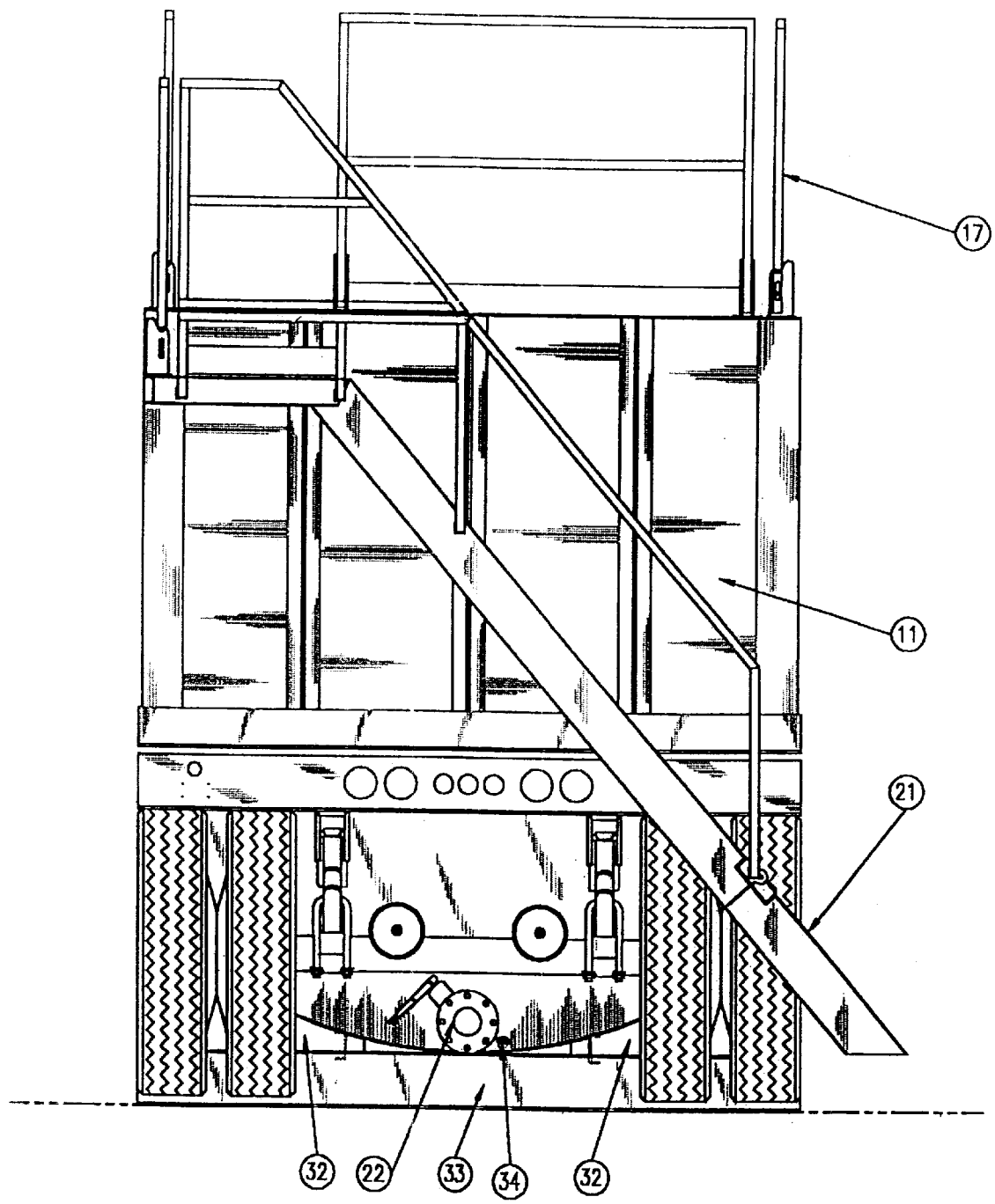
FIG. 4 is an enlarged rear elevation view of the mobile storage tank 1n accordance with the present invention.

As seen in the enlarged rear elevation view of FIG. 4, the mobile storage tank 1 includes curved saddles 32 for supporting the curved portion 16 of the bottom wall 14. The curved saddles 32 are positioned on opposite sides of the curved portion 16. Positioned beneath the saddles 32 is a chassis frame 33 for supporting the structure of the mobile storage tank 1. A rear drain 22 is positioned along the lowermost portion of the curved portion 16. The rear drain 22 is actuatable to both an opened and closed position, and pierces the rear wall 11 to access the interior cavity of the mobile storage tank 1. After the storage tank 1 has been filled to a sufficient quantity, the material contained therein may be drained via the rear drain 22 or the front drain 23.

Also located in the vicinity of the rear drain 22 is an intercavity drain 34. The intercavity drain 34 is positioned at the lowermost point of the curved portion 16. The intercavity drain 34 pierces the rear wall 11 and accesses the area formed between the double ply structure of curved portion 16 (discussed hereinafter). Another intercavity drain 34 is also disposed on the front wall 10 of the mobile storage tank 1 (not shown).

FIG. 5 shows a cross-sectional view, taken along line 5—5 of FIG. 1, of the present invention. As shown in the figure, both side walls 12 have a double ply wall 36. Positioned beneath both side walls 12 is a wall support 37. The wall support 37 is substantially triangular in shape with one surface thereof abutting each of the side walls 12 and another surface thereof abutting the two end portions of the curved portion 16 and the flat portion 15 of the bottom wall 14. The front and rear walls 10, 11 also have the double ply wall construction and similarly include an inner vertical wall 35 and an outer vertical wall 36, respectively. Likewise, the wall support 37 abuts the front and rear walls 10, 11 in the same manner discussed in connection with the side walls 12. However, the wall support 37, along the length of the rear wall 11, does not abut the curved portion 16, but instead exclusively abuts the flat portion 15 (see FIG. 1).

Positioned between each of the inner vertical walls 35 and the outer vertical walls 36 are a plurality of vertical channel wall supports 38. The vertical channel wall supports 38 provide stability for the double ply construction of the walls 10, 11 and 12. Drilled through the wall support 37, between two consecutive vertical channel wall supports 38, is at least one hole 43. The through holes 43 pass through the wall support 37 and access the area defined between an inner round bottom 40 and an outer round bottom 41 of the curved portion 16. Moreover, along where the wall support 37 abuts the flat portion 15, the through holes 43 access an area defined between an inner flat bottom 44 and an outer flat bottom 46 of the flat portion 15.

FIG. 6 is an enlarged view of the double ply wall construction in accordance with the mobile storage tank 1 of the present invention. As is seen in FIG. 6, the double ply walls 10, 11 and 12 of the present invention include crimped vertical V sections 42 on the outer vertical walls 36. These crimped vertical V sections 42 provide additional structural strength for the mobile storage tank 1 of the present invention. The crimped vertical V sections 42 are not limited to the shape disclosed herein. For example, the vertical sections can be of various shapes and sizes, while still achieving increased structural strength (i.e., square, semicircular, or the like).

The improved structural stability of the mobile storage tank 1 of the present invention, due to vertical channel wall supports 38 and the crimped vertical V sections 42, allows the interior containment cavity to have slick walls. Therefore, when the mobile storage tank 1 is drained, fluid contained therein flows easily and is not obstructed by undesirable discontinuities in the walls of the interior containment cavity.

As an alternative embodiment of the above-described construction, it is possible to construct the mobile storage tank 1 using a double ply wall with only the curved portion 16. Using this design choice is not as robust as the first embodiment, but may be a viable economic choice depending upon a forecast level of use of the mobile storage tank 1. Moreover, the mobile storage tank is not limited the lengthwise orientation of the curved portion 16. As an alternative design choice, the curved portion 16 may be widthwise so that the lowest point thereof runs parallel with the front and rear walls 10, 11. In this case, a drain would be placed on one of the side walls 12 in order to facilitate effective drainage of the mobile storage tank 1. Finally, it may be desirable to make the entire bottom wall 14 of the mobile storage tank 1 curved.

The operation of the present invention will now be disclosed. Once the mobile storage tank 1 of the present invention is placed at a work site, the filling of the mobile storage tank may commence. Filling the material into the mobile storage tank is facilitated via the front fill valve 24 or the roof fill valve 29. As filling commences, the operator will be aware of the remaining capacity of the mobile storage tank 1 based upon the indication of the fill gauge indicator 31. However, should the operator fail to recognize the fill level of the mobile storage tank 1, the overflow valve 30 will warn the operator if the mobile storage tank 1 becomes too full.

Should the exterior of the mobile storage tank 1 become damaged, i.e., an outer vertical wall 36 is punctured, the mobile storage tank 1 in accordance with the present invention will not leak due to the double ply wall construction of the containment cavity walls 10, 11, 12 (first embodiment only). Moreover, should the interior portion of the containment cavity of the mobile storage tank 1 in accordance with the present invention become punctured, material inside the containment cavity will not leak to the outside environment. If a puncture occurs in either of the front, rear, or side walls, 10, 11, or 12, the material will flow into the area between the double ply walls, through one of the plurality of holes 43 located in the vertical wall support 37 and into the area defined between the inner round bottom 40 and the outer round bottom 41. In order to discern whether a leak exists, an operator must simply open the inner cavity drain 34 to see if a material is present.

Alternatively, the double ply wall structure of the present invention may be used to store either steam or insulation therebetween. In order to store steam therebetween, a petcock 45 (see FIG. 5) may be disposed on one of the walls 10, 11, or 12 of the mobile storage tank 1 in order to allow for filling of steam therein. Moreover, it would be readily ascertainable to one of ordinary skill in the art that a steam producing generator may be integrated with the mobile storage tank 1 of the present invention in order to maintain a constant level of steam and temperature level thereof within the double ply walls structure of the present invention.

Furthermore, during construction of the mobile storage tank 1 insulation may be filled between the walls of the double ply wall construction in order to provide insulation to the material filled within the cavity portion of the mobile storage tank 1. Alternatively, if a mobile storage tank 1s constructed without insulation, and insulation is later desired, it is well within the skill of those of ordinary skill in the art to understand that foam insulating material may be injected into the walls of the mobile storage tank 1 in order to provide insulation for a material contained within the cavity of the mobile storage tank 1. If insulating material is used, it can be of a porous nature. Therefore, thermal insulating benefits could be had while drainage of the space could still be possible. In other words, if the inner round bottom wall 40, or one of the inner vertical walls 35, for example, was punctured, the fluid could still be captured in the interior space. Also, steam could be fed through the space if so desired. Moreover, an antifreeze solution could be placed between the walls of the double ply wall construction as insulation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile storage tank, comprising:

a chaise frame for supporting the mobile storage tank;

front and rear walls;

a pair of opposing side walls each having ends in contact with said front and rear walls;

a roof in contact with each of said front wall, said rear wall and said pair of opposing side walls;

a bottom wall extending from said front wall to said rear wall, said bottom wall having a generally flat portion along at least a length portion thereof and having a curved portion along a remainder of the length thereof;

a saddle portion supporting said curved portion of said bottom wall, said saddle portion being positioned between said bottom wall and said chaise frame; and a support member, said support member being positioned between abutting ends of said pair of opposing side walls and said bottom wall, and between said front and rear walls and said bottom wall, said support member having a plurality of hole members disposed therethrough, wherein said front and rear walls, said pair of opposing walls and said bottom wall are a double ply wall.

2. The mobile storage tank of claim 1, wherein each of said double ply walls, excluding said bottom wall, include an inner wall surface and an outer wall surface, said outer wall surface having a plurality of vertically formed sections therein for increasing structural stability of the mobile storage tank.

3. The mobile storage tank of claim 2, wherein said plurality of vertically formed sections are V shaped and have a mouth opening, said mouth opening of each of said plurality of V shaped vertically formed sections facing away from said inner wall surface.

4. The mobile storage tank of claim 1, further comprising a plurality of vertical channel members positioned between said double ply wall structure of said pair of opposing side walls and said front and rear walls, wherein one end of each vertical channel member abuts said support member.

5. The mobile storage tank of claim 4, wherein at least one of said plurality of hole members is positioned between each two consecutive vertical channel members of said plurality of vertical channel members.

6. The mobile storage tank of claim 1, wherein said plurality of hole members connect the double ply wall of the front, rear or side walls with the double ply wall of said bottom wall.

7. The mobile storage tank of claim 1, wherein said walls form an interior containment compartment of the mobile storage tank, said interior containment compartment having four surfaces defined therein, at least one of said four surfaces being essentially smooth thereby allowing uninhibited movement of a material contained within said containment compartment.

8. The mobile storage tank of claim 1, further comprising an actuatable drain member being disposed on at least one of said walls, said drain member having a first pipe extending through said double ply wall and a second pipe surrounding said first pipe along at least a length portion thereof, wherein said second pipe creates a double wall structure defining an area between said first and second pipes, said area serving as a containment cavity if said first pipe leaks.

9. The mobile storage tank of claim 8, wherein said front and rear walls each have at least one of said drain members provided thereon.

10. The mobile storage tank of claim 1, further comprising an actuatable inner cavity drain member disposed on said front and rear walls, said inner cavity drain members extending through said front and rear walls, respectively, and accessing an interior cavity area defined between said double ply wall of said curved portion at a lowermost point of said curved portion.

11. The mobile storage tank of claim 1, further comprising a fill valve member disposed on at least one of said walls, said fill valve member having a first pipe extending through said double ply wall and a second pipe surrounding said first pipe along at least a length portion thereof, wherein said second pipe creates a double wall structure defining an area between said first and second pipes, said area serving as a containment cavity if said first pipe leaks.

12. The mobile storage tank of claim 1, further comprising a steam filling valve member disposed on at least one of said walls.

13. A mobile storage tank, comprising:
front and rear walls;
a pair of opposing side walls each having ends in contact with said front and rear walls;
a bottom wall abutting said front and rear walls and said pair of opposing side walls, said bottom wall having a sloped portion along at least a portion thereof; and
an actuatable drain member being disposed on at least one of said walls, said drain member having a first pipe extending through one of said walls and a second pipe surrounding said first pipe along the length thereof, wherein said second pipe creates a double wall structure defining an area between said first and second pipes, said area serving as a containment cavity if said first pipe leaks,
wherein at least said sloped portion is a double ply wall.

14. The mobile storage tank of claim 13, wherein said walls form an interior containment compartment of the mobile storage tank, said interior containment compartment having at least three surfaces defined therein, at least one of said three surfaces being essentially smooth thereby allowing uninhibited movement of a material contained within said containment compartment.

15. The mobile storage tank of claim 13, further comprising an actuatable inner cavity drain member disposed on at least one of said walls, said inner cavity drain members extending through said at least one of said walls, and accessing an interior cavity area defined between said double ply wall of said sloped portion at a lowermost point of said sloped portion.

16. The mobile storage tank of claim 13, further comprising a fill valve member disposed on at least one of said walls, said fill valve member having a first pipe extending through one of said walls and a second pipe surrounding said first pipe along a length portion thereof, wherein said second pipe creates a double wall structure defining an area between said first and second pipes, said area serving as a containment cavity if said first pipe leaks.

17. The mobile storage tank of claim 13, further comprising a steam filling valve member disposed on at least one of said walls.

18. A mobile storage tank, comprising:
front and rear walls;
first and second side walls each having ends in contact with said front and rear walls; and
an autonomously formed rigid bottom wall positioned under said front and rear walls and said first and second side walls, said bottom wall having a sloped portion along at least a portion thereof, said sloped portion having a double ply structure, wherein said double ply structure contains an insulating material, said insulating material including at least one of a porous, liquid permeable material and steam.

19. The mobile storage tank according to claim 18, further comprising a support member, said support member being positioned between said bottom wall and said first and second side walls, said support member having a plurality of hole members disposed therethrough.

20. The mobile storage tank according to claim 18, further comprising an actuatable drain member being disposed on at last one of said walls, said drain member having a first pipe extending through one of said walls and a second pipe surrounding said first pipe the length thereof, wherein said second pipe creates a double wall structure defining an area between said first and second pipes, said area serving as a containment cavity if said first pipe leaks.

21. The mobile storage tank according to claim 18, wherein said first and second side walls and said front and rear walls are autonomously formed and rigid.

22. The mobile storage tanks according to claim 18, wherein said first and second side walls have a double ply structure.

23. The mobile storage tank according to claim 22, wherein said double ply structures contain porous, liquid permeable material.

24. The mobile storage tank according to claim 22, wherein said double ply structures contain steam.

* * * * *